United States Patent [19]

Fujii et al.

[11] Patent Number: 5,260,982
[45] Date of Patent: Nov. 9, 1993

[54] SCATTERED RADIATION IMAGING APPARATUS

[75] Inventors: Masashi Fujii, Tokyo; Kazunori Masanobu, Saitama; Teruo Yamamoto, Tokyo, all of Japan

[73] Assignee: Kabushiki Kaisha Toshiba, Kawasaki, Japan

[21] Appl. No.: 881,297

[22] Filed: May 11, 1992

[30] Foreign Application Priority Data

May 31, 1991 [JP] Japan ................................. 3-129905

[51] Int. Cl.⁵ ......................................... G01N 23/201
[52] U.S. Cl. ......................................... 378/87; 378/57; 378/90
[58] Field of Search ................. 378/57, 86, 87, 90, 378/62

[56] References Cited

U.S. PATENT DOCUMENTS

| Re. 28.544 | 9/1975 | Stein et al. | |
|---|---|---|---|
| 4,239,969 | 12/1980 | Haas et al. | 378/57 |
| 4,454,605 | 6/1984 | DeLucia | 378/57 |
| 4,530,006 | 7/1985 | Blaustein et al. | 378/57 |
| 4,799,247 | 1/1989 | Annis et al. | |
| 4,956,856 | 9/1990 | Harding | 378/87 |
| 5,022,062 | 6/1991 | Annis | 378/87 |
| 5,065,418 | 11/1991 | Bermbach et al. | 378/87 |

FOREIGN PATENT DOCUMENTS 2217009 10/1989 United Kingdom ................. 378/57

Primary Examiner—David P. Porta
Attorney, Agent, or Firm—Oblon, Spivak, McClelland, Maier & Neustadt

[57] ABSTRACT

A flying-spot pencil beam generating unit is arranged under a conveyor. A backscatter detector is located between an upper belt and a lower belt of the conveyor. Thus, this apparatus is set up to be perpendicular. A pencil beam is irradiated upward and scans an object on the belt of the conveyor by the flying-spot pencil beam generating unit, as the conveyor carries the object to be inspected. The backscatter detector gathers Compton scatter X-rays transmitted through the upper belt, as they reflect back from the object. A CPU produces a backscatter image based on the detection signal output from the backscatter detector. The backscatter image is shown on a display unit to enable detection of low-Z materials, such as plastic explosives and narcotics. In addition to the backscatter imaging, the unit may retain use of a transmitted image to thus reliably detect metal-based weapons such as guns.

8 Claims, 5 Drawing Sheets

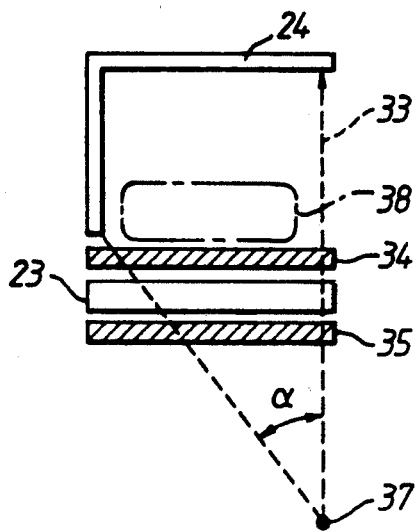
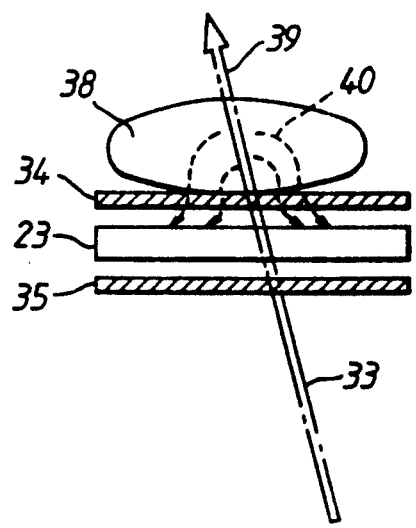
Fig.3.     Fig.4.
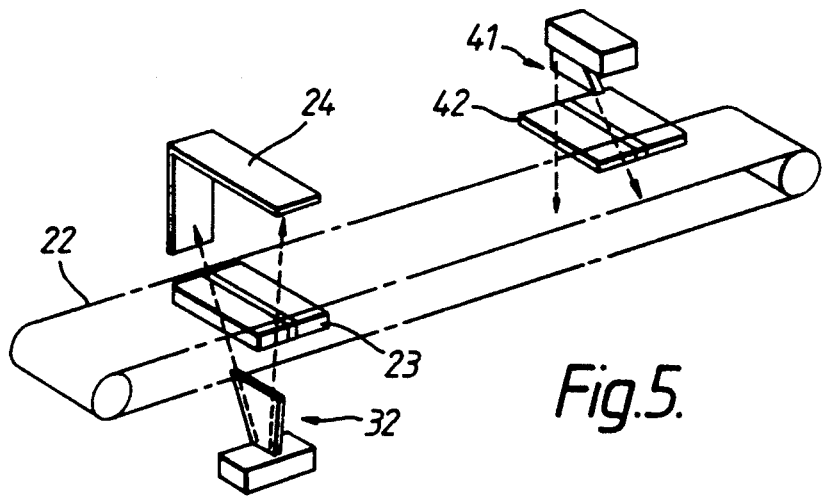
Fig.5.
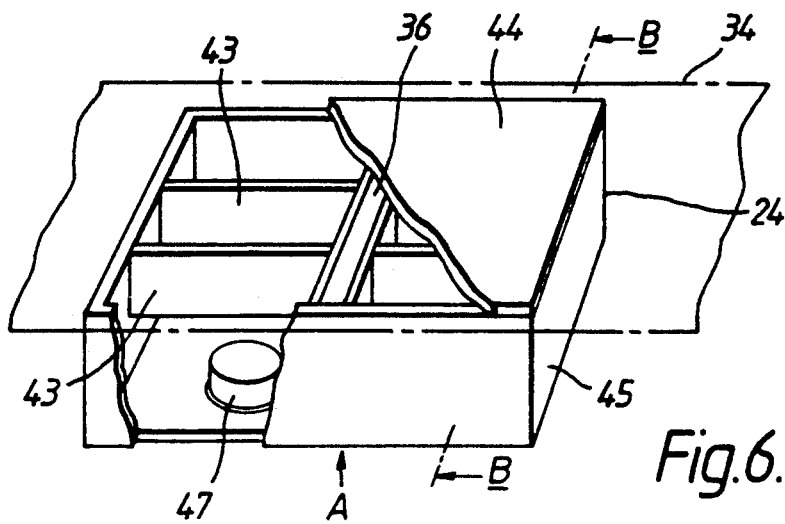
Fig.6.

$\theta_1 < \theta_2$

5,260,982

SCATTERED RADIATION IMAGING APPARATUS

BACKGROUND OF THE INVENTION

1. Field of the Invention

The present invention relates to a scattered radiation imaging apparatus which is capable of obtaining a good image of low Z materials, such as plastic explosives and narcotics, that had been undetectable in previous technology, for the purpose of detecting entrance of articles which are considered dangerous (such as plastic explosives) or are regulated by law (such as narcotics) in the security field, especially at airport and other regions.

2. Description of the Background Art

One conventional technique for detecting Low Z materials which is employed in the prior art is exemplified by Annis et al U.S. Pat. No. 4,799,247.

The apparatus described is shown in FIG. 1. In this apparatus, an X-ray source 1 provides a generally conical beam of X-rays which is directed at radiation opaque plate 2 with a slit 3. The slit 3 allows a sheet-like X-ray beam to pass to a rotating disk 4 formed with a slit 5. As the rotating disk 4 rotates, the rotating disk 4 intercepts the sheet beam. And the slit 5 allows a pencil beam 6 to pass. The pencil beam 6 scans an object 7 to be inspected, and a conveyor 9 carries the object 7 in the direction of arrow 8 across a line of pencil beam 6.

A back scatter detector 10 responds to back scatter X-rays (particularly by Compton scattering) as they reflect back from the object 7 and outputs back scattered signals corresponding to the back scattered X-rays.

The back scattered signals are provided to the scatter electronics 11 where they may be summed and used to develop a video signal for driving display 12 which is a scatter imaging device.

The transmitted detector 13 responds to X-radiation transmitted through the object 7, and outputs transmitted signals to a transmitted electronics 14 corresponding to the transmitted X-ray.

In the same way, a display 15 shows a transmitted X-ray image based on the transmitted signals.

Since high Z materials readily absorb more X-rays than low Z materials, the transmitted image can readily be used to identify the shape of any high Z material by the particular shape of the shadow the high Z material produces.

The scatter image can similarly be used to identify the shape of any low Z material by the particular shape of the shadow the low Z material produces.

This apparatus of FIG. 1 is effective in carrying out the inspection of the object, but is also known to have the following problems.

In this apparatus, the flying spot scanner and detectors are horizontally arranged, and the pencil beam is irradiated in the horizontal direction.

Thus, the shape of the apparatus is horizontal. Therefore the apparatus occupies a large floor space.

SUMMARY OF THE INVENTION

The object of this invention is therefore to provide a scattered radiation imaging apparatus wherein the apparatus occupies small floor space.

In order to achieve this object, this invention comprises;
first generation means for generating radiation;
first forming means for forming radiation generated by said first generating means into a first pencil beam repeatedly sweeping along a generally horizontal line;
conveyor means having an upper and lower belt for carrying an object to be imaged in a direction perpendicular to said line so that said first pencil beam scans said object on the upper belt of said conveyor,
first scatter detector for detecting radiation scattered by said object on said upper belt of said conveyor to obtain first scatter detection data, said scatter detector being located between said upper belt and said lower belt of said conveyor, and being equipped with slit through which said first pencil beam passes;
first display means for displaying an scatter image of said object produced from said first scatter detection data obtained by said first scatter detector.

BRIEF DESCRIPTION OF THE DRAWINGS

FIG. 3 is a vertical cross section of the scattered radiation imaging apparatus of FIG. 2.

FIG. 4 is an action explanation of the scattered radiation imaging apparatus of FIG. 3.

FIG. 5 is a schematic perspective view for another embodiment of a scattered radiation imaging apparatus according to the present invention.

FIG. 6 is a perspective view of a back scatter detector for use in an embodiment of the scattered radiation imaging apparatus.

DETAILED DESCRIPTION OF THE PREFERRED EMBODIMENTS

Figure 1:
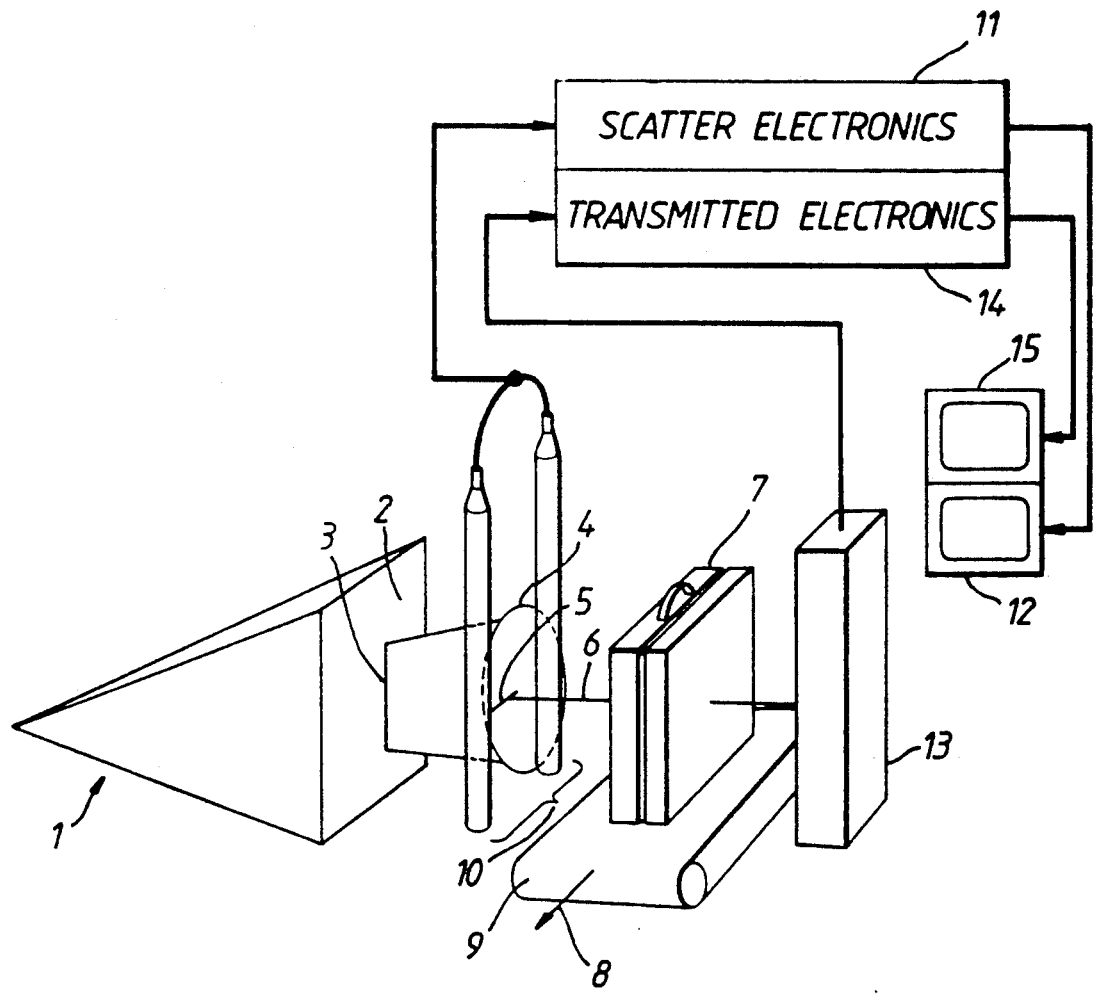
FIG. 1 is a schematic perspective view of an X-ray inspection system, which employs a transmitted detector and a back scatter detector respectively along with associated displays.
Figure 2:
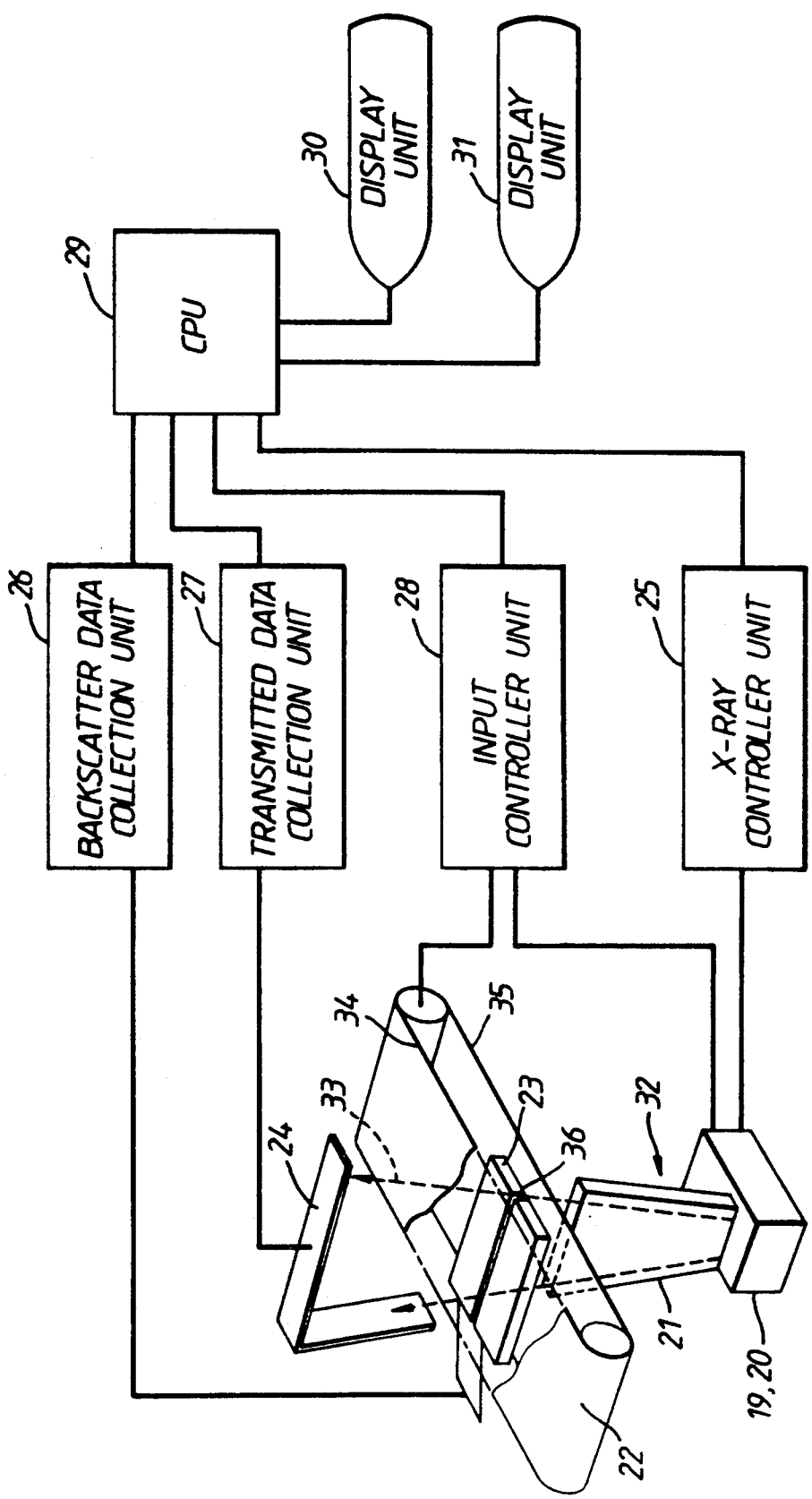
FIG. 2 is a schematic perspective view and block diagram for one embodiment of a scattered radiation imaging apparatus according to the present invention.

Referring now to FIG. 2, there is shown one embodiment of a scattered radiation imaging apparatus according to the present invention.

The scattered radiation imaging apparatus comprises an X-ray tube 19 for continuously emitting an X-ray onto an object to be examined; a chopper wheel 20 for shaping the X-ray emitted by the X-ray tube 19 in a turning fan shaped beam; a linear colimeter 21 for shaping the turning fan shaped beam in a flying spot pencil beam which repeatedly sweeps a line in space; a conveyor 22 for carrying the object in the direction across the line being scanned; a backscatter detector 23 for detecting back scattered X-rays from the object; a transmitted detector 24 for detecting transmitted X-rays emerging from the object; a X-ray controller unit 25 for controlling the emission of the X-ray from the X-ray tube 19; a backscatter data collection unit 26 for sampling detection data outputted from the backscatter detector 23 and converting the sampled data into signal data by applying A/D conversion and other preprocessings; a transmitted data collection unit 27 for sampling detection data outputted from the transmitted detector 24 and converting the sampled data in to signal data by applying A/D conversion and other preprocessings; an input controller 28 for facilitating various control operations by an operator; a CPU 29 for controlling operation of an entire scattered radiation imaging apparatus, as well as for generating a backscatter image and a transmitted image of the object to be examined from the signal data obtained by the backscattered data collection unit 26 and the transmitted data collection unit 27; a display unit 30 for displaying the backscatter image; and a display unit 31 for displaying the transmitted image.

Referring now to FIG. 2, a generating flying-spot pencil beam unit 32 includes the X-ray tube 19, the chopper wheel 20 and the linear colimeter 21.

The flying spot pencil beam is formed from the radiation emitted by the X-ray tube 19, in turn, a cone beam by the chopper wheel 20 and then a flying pencil beam 33 by the linear collimator 21.

The generating flying spot beam unit 32 is located under the conveyor 22.

The conveyor 22 provides for motion of an object to be inspected on it in a direction generally mutually perpendicular to the direction of the pencil beam 33.

The backscatter detector 23 is located between upper belt 34 side and lower belt 35 side of the conveyor 22, and furthermore is located close to the upper belt 34 side.

The backscatter detector 23 is equipped with a slit 36 through which the flying pencil beam 33 passes.

The transmitted detector 24 is located over the upper belt 34 side of the conveyor 22, its shape is L type for detecting all the pencil beam transmitted through the object.

Referring now to FIG. 3, an X-ray focus position 37 is perpendicularly located under the edge of the horizontal detection plane of the transmitted detector 24.

The pencil beam 33 can be scanned to the edge of the horizontal detection plane of the transmitted detector 24 by an angle α.

As a result, the object 38 to be inspected is completely scanned by the pencil beam provided that the width of the object 38 is less than the width of the upper belt 34 side.

Referring now to FIGS. 2, 3, and 4, the operation of this scattered imaging apparatus for inspecting the object will be described.

The pencil beam 33 penetrates both belt sides 34, 35 of the conveyor 22, and passes through the slit of the backscatter detector 23. Thus, the pencil beam 33 scans the object 38 on the upper belt 34 of conveyor.

The transmitted detector 24 detects the X-rays 39 which penetrate through the object 38, and backscatter detector 23 detects the X-rays 40 which are scattered by the object 38.

The X-rays 40 scattered by the object 38 penetrate the upper belt 34 side of the conveyor 22, and the backscattered X-rays 40 are detected by the backscatter detector 23.

The backscatter detector 23 is located close to the upper belt 34 side of the conveyor 22. Thus, the object 38 is close to the backscatter detector. Because the backscattered X-rays 40 penetrate only the upper belt 34 before reaching the backscatter detector 23, the backscattered X-rays 40 aren't absorbed by the lower conveyor belt 35. Thus, the attenuation rate of low energy level backscattered X-rays is low, and the detection effciency of the backscattered X-rays is high.

By combining the scanning action of the pencil beam 33 with the relative motion of the object 38 to the pencil beam 33, a raster scan of the pencil beam 33 is carried out to the object 38.

Each of the two detectors 23, 24 generates detection data corresponding to X-rays incident on the detectors 23, 24.

The detection data generated by the detector 23, 24 are inputted to the transmitted data collection unit 27 and backscatter data collection unit 26 where they are sampled at regular intervals.

Transmitted data collection unit 26 and backscatter data collection unit 27 provide signals to the CPU 29, where they may be summed, controlled, and used to develope a video signal for the display unit 30, 31.

The display unit 30 displays image corresponding to the transmitted image of the object 38. The display unit 31 displays image corresponding to the backscattered image of the object 38.

The transmitted image can readily be used to identify the shape of any high Z material, for example a handgun or a bomb manufactured from metals. The backscattered image can readily be used to identify the shape of any low Z material, for example a bomb manufatured from plastics or narcotics. The operator can inspecte the contents of the object 38.

Referring now to FIG. 5, there is shown one modification of the embodiment described above according to the present invention.

This is a modification of the embodiment described above. The modification uses an upward illumination type, as described above, and another flying spot pencil beam generating unit 41, of the downward illunination type, with a backscattered detector 42. The flying spot pencil beam generating unit 41 is located over the conveyor 22 and on the right side of the conveyor.

The backscattered detector 42 is located between the flying spot pencil beam generating unit 41 and the upper belt.

Thus, this modification can generate two backscattered images for either side of the object.

Each backscatter detector 23, 42 will preferentially display low Z materials lying closer to each back scatter detector.

Thus an operater can exactly inspect the inside of the object.

Figure 7:
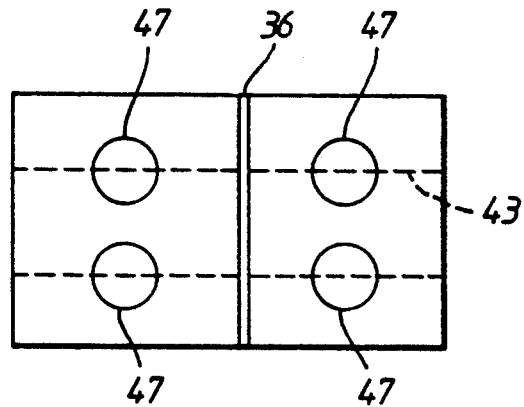
FIG. 7 is a view in the direction of the arrow A in FIG. 6.
Figure 8:
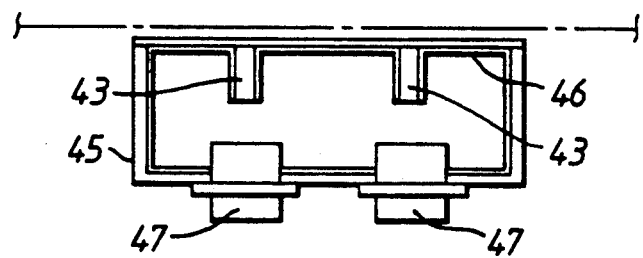
FIG. 8 is a cross-sectional view taken along line B—B in FIG. 6.

Referring now to FIGS. 6, 7, and 8, a detailed construction of the backscattered detector 23 will be described. It is required that the backscattered detector 23 effectively respond to backscattered X-rays 40 from the object 38.

Therefore, the backscatter detector 23 must be located closer to the upper belt 34 of the conveyor 22. And it is required that the backscattered detector 23 withstand the weight of the object 38 on the upper belt 34. In the backscattered detector 23 of the embodiment, the backscattered detector 23 is equipped with many reinforcement beams 43 spanning between the sides of two hollow structures of the dark box 45.

It is to be desired that the material of the front board 44 absorb X-rays and have a low contact resistance.

The back of reinforcement beam 43 doesn't reach to the bottom of the dark box 45, and the top of reinforcement beam 43 is connected with the front board 44.

The dark box 45 isn't separated by the reinforcement beam 44.

The inside of the dark box 45 and the reinforcement beam 43 are covered with a fluorescent substance 46, which converts scattered X-rays to light.

A serise of photomultiplier tubes 47 (abbreviated hereafter as PMT) are mounted on the bottom of the dark box 45 under each reinforcement beam 43.

Thus, the efficiency of the x-ray detection is maintained, and the number of the PMT 47 can be reduced.

Figure 9:
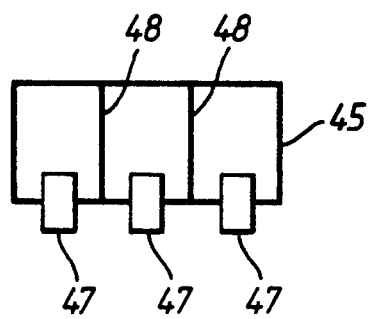
FIG. 9 is a cross-sectional view of one variant example for a back scatter detector in FIG. 6.

Referring now to FIG. 9 there is shown one modification of the backscattered detector.

In this modification, the dark box 45 is perfectly separated by the reinforcement beams 48, and the PMT 47 are located within each separated area of the dark box 45.

Figure 10:
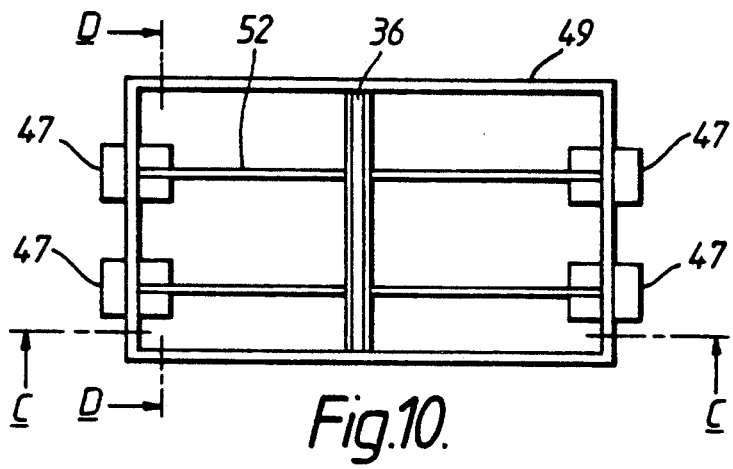
FIG. 10 is a cross-sectional view of another variant example for a back scatter detector in FIG. 6.
Figure 11:
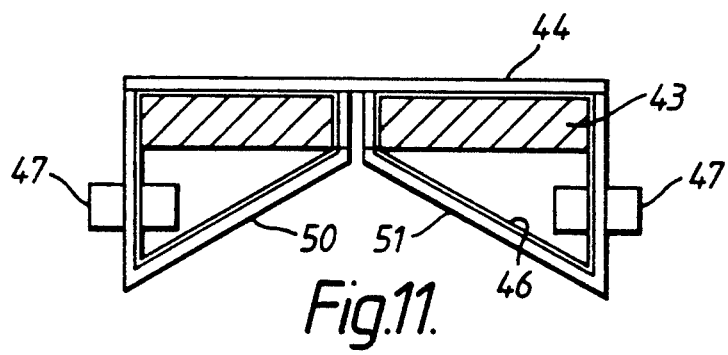
FIG. 11 is a vertical sectional view taken along line C—C in FIG. 10.
Figure 12:
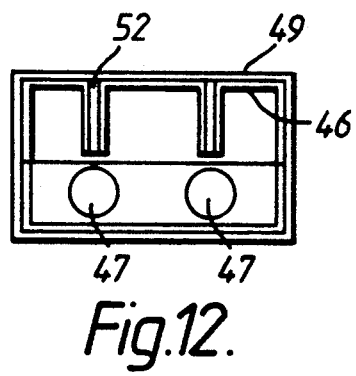
FIG. 12 is a cross-sectional view in the direction of the arrow C in FIG. 11.

Referring now to FIGS. 10, 11, and 12, there is shown one variation of the backscattered detector.

The bottom of the dark box 49 is an inclined plane.

The depth of a hollow structure 50, 51 within the dark box gradually decreases as the position moves in the direction of the center part equipped with the slit 36.

The shape of each hollow structure 50, 51 is symmetrical on the slit 36.

The reinforcement beam 42 spans between both sides of the hollow structure 50, 51.

Figure 13:
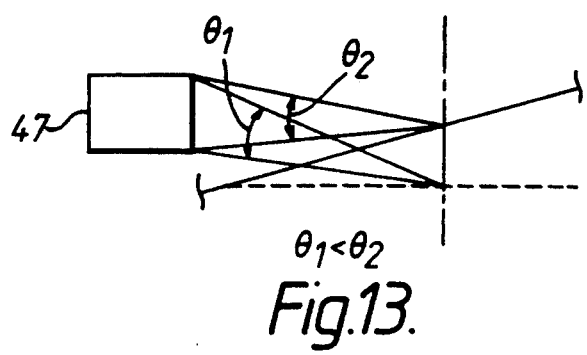
FIG. 13 is an illustrative diagram showing explanation of the solid angle in FIG. 11, 12.

The top of the reinforcement beam 43 is located on the front board 43. In this variation of the backscattered detector, because PMT 47 is mounted on the widder side of the dark box and the bottom of the dark box is inclined, as shown in FIG. 13, an incidence solid angle θ of light for PMT 47 increases, and the detection plane of PMT 47 is close to the generation point of the scattered X-rays. Thus the efficiency of the X-ray detection improves.

Modifications and variations of the above embodiments may be made without departing from the novel and advantageous features of the present invention. Accordingly, all such modifications and variations are intended to be included within the scope of the appended claims.

What is claimed is:

1. A scattered radiation imaging apparatus, comprising:
   first generation means for generating radiation;
   first forming means for forming radiation generated by said first generating means into a first pencil beam repeatedly sweeping along a generally horizontal line;
   conveyor means having an upper belt and a lower belt for carrying an object to be imaged in a direction perpendicular to said generally horizontal line so that said first pencil beam scans said object on the upper belt of said conveyor;
   a first scatter detector for detecting radiation scattered by said object on said upper belt of said conveyor to obtain first scatter detection data, said first scatter detector being located between said upper belt and said lower belt of said conveyor, and being equipped with a slit through which said first pencil beam passes;
   first display means for displaying a scatter image of said object produced from said first scatter detection data obtained by said first scatter detector.

2. The scattered radiation imaging apparatus as claimed in claim 1, further comprising:
   a transmitted detector for detecting radiation penetrating through said object to obtain transmitted detection data, said transmitted detector being located over said conveyor means;
   second display means for displaying a second image of said object produced from said transmitted detection data obtained by said transmitted detector.

3. The scattered radiation imaging apparatus as claimed in claim 2, further comprising:
   second generation means for generating radiation, the second generation means being located over said conveyor means;
   second forming means for forming radiation generated by said second generation means into a second pencil beam repeatedly sweeping perpendicular to a moving direction of said conveyor means, said second forming means being located over said conveyor means;
   a second scatter detector for detecting radiation scattered by said object on said upper belt of said conveyor to obtain second scatter detection data, said second scatter detector being located between said second forming means and said conveyor means, and being equipped with a slit through which said second pencil beam passes;
   third display means for displaying a third image of said object produced from said second scatter detection data obtained by said second scatter detector.

4. The scattered radiation imaging apparatus as claimed in any one of claims 1–3, wherein said first scatter detector comprises:
   a dark box, which is hollow;
   reinforcement beams spanning between opposite sides of said dark box to support a weight of said object;
   first converting means for converting the radiation into light, said first converting means being formed inside of said dark box; and
   second converting means for converting light converted by the first converting means into an electric signal to give said first scatter detection data, said second converting means being mounted on a bottom of said dark box.

5. The scattered radiation imaging apparatus as claimed in any one of claims 1–3, wherein said first scattered detector comprises:
   a dark box, which is hollow, wherein a bottom of said dark box is inclined;
   reinforcement beams spanning between opposite sides of said dark box to support a weight of said object;
   first converting means for converting the radiation into light, said first converting means being formed inside of said dark box; and
   second converting means for converting light converted by the first converting means into an electric signal to give said first scatter detection data.

6. The scattered radiation imaging apparatus as claimed in either of claims 2 or 3, wherein the transmitted detector is L-shaped.

7. The scattered radiation imaging apparatus as claimed in claim 4, wherein the transmitted detector is L-shaped.

8. The scattered radiation imaging apparatus as claimed in claim 5, wherein the transmitted detector is L-shaped.

* * * * *